(12) United States Patent
Miwa et al.

(10) Patent No.: US 11,391,665 B2
(45) Date of Patent: Jul. 19, 2022

(54) CORROSION TESTING METHOD AND CORROSION TESTING DEVICE

(71) Applicant: Nippon Telegraph and Telephone Corporation, Tokyo (JP)

(72) Inventors: Takashi Miwa, Tokyo (JP); Azusa Ishii, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 131 days.

(21) Appl. No.: 17/047,591

(22) PCT Filed: Apr. 5, 2019

(86) PCT No.: PCT/JP2019/015140
§ 371 (c)(1),
(2) Date: Oct. 14, 2020

(87) PCT Pub. No.: WO2019/203028
PCT Pub. Date: Oct. 24, 2019

(65) Prior Publication Data
US 2021/0116357 A1 Apr. 22, 2021

(30) Foreign Application Priority Data
Apr. 16, 2018 (JP) .............................. JP2018-078214

(51) Int. Cl.
*G01N 17/04* (2006.01)
*G01N 17/00* (2006.01)

(52) U.S. Cl.
CPC ........... *G01N 17/04* (2013.01); *G01N 17/006* (2013.01)

(58) Field of Classification Search
CPC ............................. G01N 17/006; G01N 17/04
(Continued)

(56) References Cited

U.S. PATENT DOCUMENTS

| 8,927,289 B2 * | 1/2015 | Fujii | .................... G01N 17/006 422/53 |
| 2013/0164852 A1 * | 6/2013 | Fujii | .................... G01N 17/006 422/53 |
| 2021/0116357 A1 * | 4/2021 | Miwa | .................... G01N 17/006 |

FOREIGN PATENT DOCUMENTS

| CN | 213167223 U * | 5/2021 |
| JP | 4637978 B2 * | 2/2011 |

(Continued)

OTHER PUBLICATIONS

Progressive Automations—Mark Luciano, Salt Spray Testing to Evaluate Corrosion Resistance. Jun. 10, 2021 (Year: 2021).*

(Continued)

*Primary Examiner* — Jermele M Hollington
*Assistant Examiner* — Sean Curtis
(74) *Attorney, Agent, or Firm* — Slater Matsil, LLP

(57) ABSTRACT

A painting fiber probe having a measurement surface on which a coating film is formed with the same painting specification as that of a sample (painted steel sheet) is placed in a test tank together with the sample. A cycle consisting of three steps of saline water spraying, drying and wetting is repeated on the sample and the painting fiber probe. In the drying step of the cycle, absorbance at a specific wavelength of the coating film formed on the painting fiber probe is measured at a regular interval and drying is ended when the measured absorbance satisfies a predetermined condition.

13 Claims, 4 Drawing Sheets

(58) Field of Classification Search
USPC .................................. 324/71.2, 700
See application file for complete search history.

(56) References Cited

FOREIGN PATENT DOCUMENTS

| | | | | |
|---|---|---|---|---|
| JP | 2019184510 A | * | 10/2019 | ........... G01N 17/006 |
| WO | WO-2019203028 A1 | * | 10/2019 | ........... G01N 17/006 |

OTHER PUBLICATIONS

ISSF (International Stainless Steel Forum)—The Salt Spray Test and Its Use in Ranking Stainless Steels: The Test and its Limits. May 2008. (Year: 2008).*

English Translation of PCT/JP2019/015140 Written Opinion of the International Searching Authority. dated Jul. 9, 2019. (Year: 2019).*

Heresite Protective Coatings LLC—What is salt spray testing and how does the process work? 2021 (Year: 2021).*

Japanese Industrial Standards, "JIS K5600-7-9 : Cycle Corrosion Test Method" Web Literature, http://kikakurui.com/k5/K5600-7-9-2006-01.html, Apr. 9, 2018 (Reading Day), 17 pages.

Suga, "A corrosion test method for automobile materialsand parts, and new test methods by its application," Rust Prevention & Control Japan, vol. 38, No. 4, 1994, pp. 26-36.

Miwa et al., "Various accelerated corrosion tests and outdoorexposure tests using coated steel sheetscomparison of corrosion behavior," Rust Prevention & Control Japan, vol. 61, No. 12, 2017, pp. 449-455.

* cited by examiner

|  | SALINE WATER SPRAYING STEP | | | DRYING STEP | | HUMIDIFICATION STEP | |
| --- | --- | --- | --- | --- | --- | --- | --- |
|  | NaCl CONCEN-TRATION (wt%) | TEMPERA-TURE (C) | TIME (h) | TEMPERA-TURE (C) | TIME (h) | TEMPERA-TURE (C) | TIME (h) |
| PRIOR ART | 5 | 35 | 2 | 60 | 4 | 50 | 2 |
| PRESENT INVENTION | 5 | 35 | 2 | 60 | AROUND ONE HOUR | 50 | 2 |

Fig. 5

|  | PRIOR ART | PRESENT INVENTION |
|---|---|---|
| CORROSION SPEED OF STEEL (g/m²/day) | 80 | 127 |
| CORROSION SPEED OF ZINC (g/m²/day) | 15 | 23 |

CORROSION TESTING METHOD AND CORROSION TESTING DEVICE

CROSS-REFERENCE TO RELATED APPLICATIONS

This application is a national phase entry of PCT Application No. PCT/JP2019/015140, filed on Apr. 5, 2019, which claims priority to Japanese Application No. 2018-078214, filed on Apr. 16, 2018, which applications are hereby incorporated herein by reference.

TECHNICAL FIELD

The present invention relates to a corrosion test method and a corrosion test device for evaluating corrosion resistance of paint.

BACKGROUND

Conventionally, composite cycle tests defined by JIS, ISO or the like for evaluating corrosion resistance of steel materials and coating films used outdoors for a long period of time have been widely applied. When evaluating corrosion resistance of paint in these tests, a painted steel material is used as a sample, and a cycle consisting of three steps of saline water spraying, drying and wetting is repeated on the sample (see Non-Patent Literature 1). Hereinafter, a test using a painted steel material as a sample will also be referred to as a paint corrosion test in the present specification.

CITATION LIST

Non-Patent Literature

Non-Patent Literature 1: JIS K5600-7-9 Cycle Corrosion Test Method, [searched on Apr. 9, 2018], Internet <URL: http://kikakurui.com/k5/K5600-7-9-2006-01.html>.
Non-Patent Literature 2: Shigeru Suga, Corrosion Test Method for Automobile Materials and Parts, New Test Method and Rust Prevention Management by Applying the Same, 1994-4, p. 26 to 36, 1994.
Non-Patent Literature 3: [14] Takashi Miwa, Yukitoshi Takeshita, Azusa Ishii, "Comparison of Corrosion Behavior by Various Accelerated Corrosion Tests and Open-Air Exposing Tests Using Painted Steel Sheet" Rust Prevention Management, 61(12), 449-455 (2017).

SUMMARY

Technical Problem

However, since conventional paint corrosion tests simulate an environment in which paint is used outdoors for a long time, a problem exists in that the tests require a long time. For example, in the above-described cycle A of JIS K5600-7-9, it is necessary to repeat a cycle consisting of three steps of a saline water spraying step (2 hours), a drying step (4 hours) and a wetting step (2 hours) for a long time (on the order of several hundreds to several thousands of hours) on the sample.

Embodiments of the present invention have been implemented to solve the above-described problem and it is an object of embodiments of the present invention to provide a corrosion test method and a corrosion test device capable of reducing the time required for a paint corrosion test.

Means for Solving the Problem

In order to attain the above-described object, embodiments of the present invention are a corrosion test method for conducting a corrosion test by using a painted steel material as a sample (116), using a fiber probe ($115_1$) having a measurement surface ($115_2$) on which a coating film ($115_3$) is formed with the same painting specification as that of the sample, as a painting fiber probe (115), and placing the sample and the painting fiber probe in a test tank (11) to evaluate corrosion resistance of the paint, the method including a saline water spraying step (S1) of spraying saline water on the sample and the painting fiber probe, a drying step (S2) of drying the sample and the painting fiber probe after the saline water spraying step, and a wetting step (S3) of setting the sample and the painting fiber probe in a wet state after the drying step, in which in the drying step, absorbance at a specific wavelength of the coating film formed on the painting fiber probe is measured at regular intervals and drying of the sample and the painting fiber probe is ended when the measured absorbance satisfies a predetermined condition.

In embodiments of the present invention, in the drying step, the absorbance at a specific wavelength of the coating film formed on the painting fiber probe is measured at regular intervals (e.g., measured using spectrometric methods such as FT-IR (Fourier transform infrared spectroscopy), Raman spectroscopy, ultraviolet/visible/near-infrared spectroscopy), and when the measured absorbance satisfies the predetermined condition, drying of the sample and painting fiber probe is ended.

For example, drying of the sample and painting fiber probe is ended when a value of the measured absorbance becomes a predetermined value or less, or drying of the sample and painting fiber probe is ended when a variation per unit time of the measured absorbance falls to a predetermined value or less. In this way, it is possible to shorten the time of the drying step and shorten the time required for a paint corrosion test.

Note that components on drawings corresponding to components of embodiments of the invention are denoted by reference numerals in parentheses in the above description as an example.

Effects of Embodiments of the Invention

As described above, according to embodiments of the present invention, a fiber probe having a measurement surface on which a coating film is formed with the same painting specification as that of the sample is used as a painting fiber probe, the absorbance at a specific wavelength of the coating film formed on the painting fiber probe is measured during drying of the sample and painting fiber probe, and the drying of the sample and painting fiber probe is ended when the measured absorbance satisfies a predetermined condition, and so it is possible to shorten the time of the drying step and shorten the time required for a paint corrosion test.

BRIEF DESCRIPTION OF THE DRAWINGS

FIG. 5 is a diagram illustrating test results of corrosion tests on copper and zinc.

DETAILED DESCRIPTION OF ILLUSTRATIVE EMBODIMENTS

Hereinafter, an embodiment of the present invention will be described in detail with reference to the accompanying drawings.

Embodiment

Figure 1:
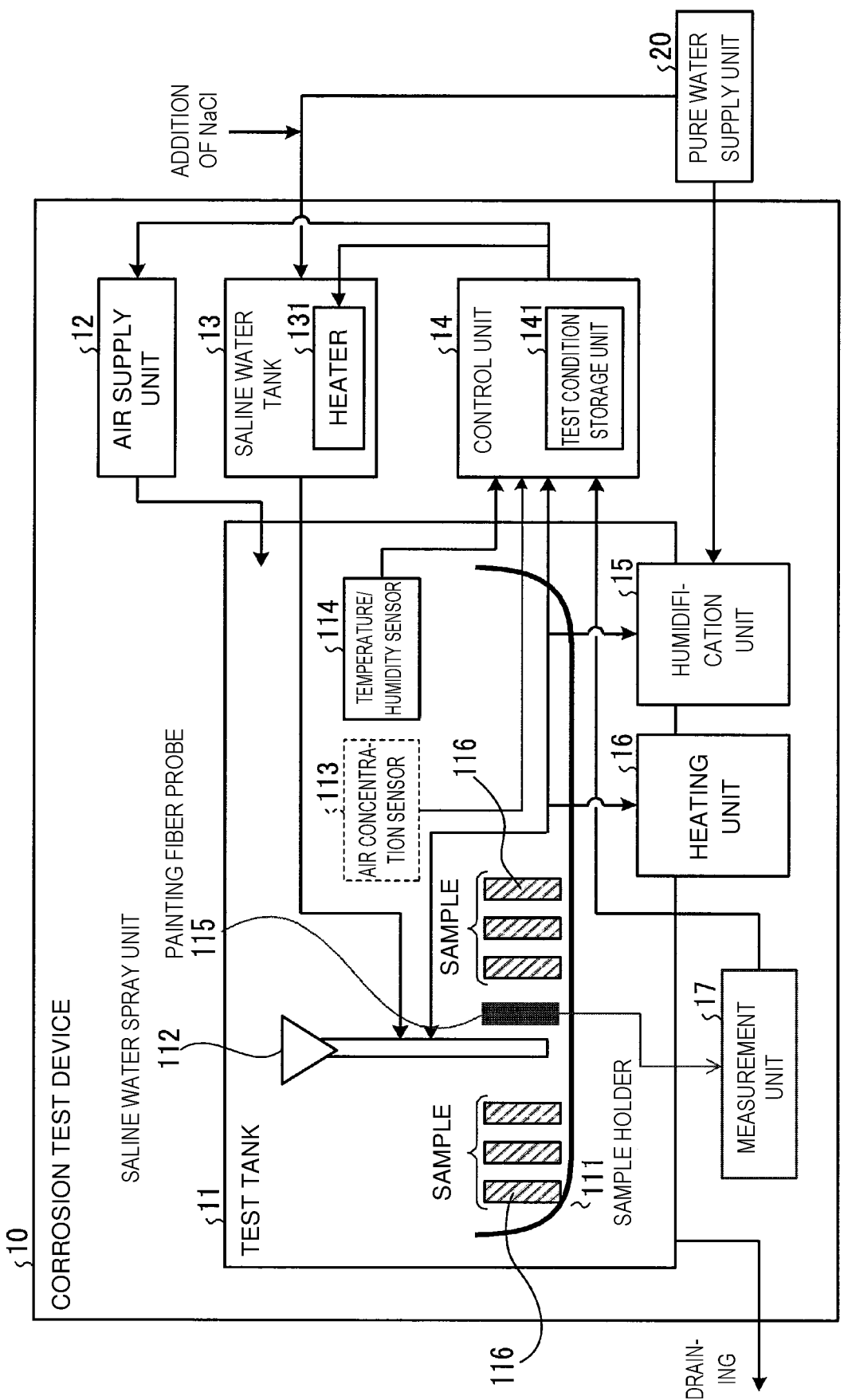
FIG. 1 is a diagram illustrating a configuration example of a corrosion test device according to an embodiment of the present invention.

FIG. 1 illustrates a configuration of a corrosion test device 10 of the present embodiment. The corrosion test device 10 is provided with a test tank 11, an air supply unit 12, a saline water tank 13, a control unit 14, a humidification unit 15, a heating unit 16 and a measurement unit 17.

In the corrosion test device 10, the test tank 11 is provided with a sample holder 111, a saline water spray unit 112 and a temperature/humidity sensor 114, and a painting fiber probe 115 is disposed in the sample holder 11 together with samples (painted steel materials) 116.

Figure 2:
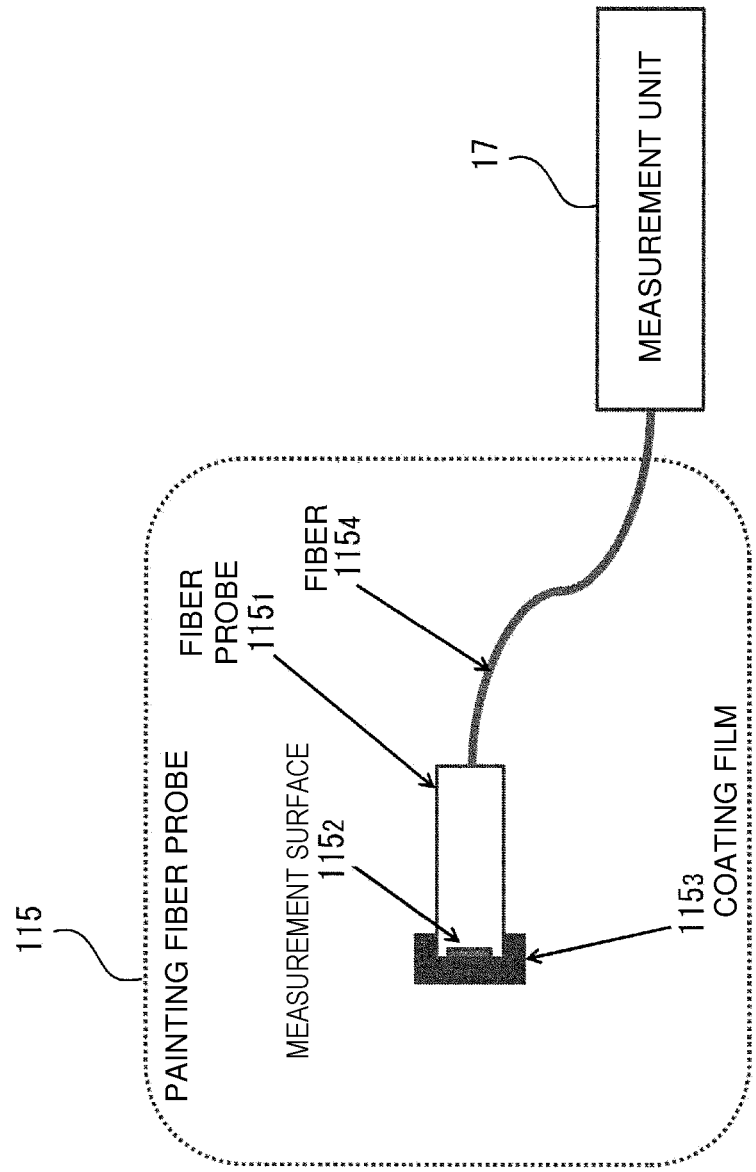
FIG. 2 is a diagram illustrating a configuration example of a painting fiber probe used for the corrosion test device.

As shown in FIG. 2, the painting fiber probe 115 includes a coating film $115_3$ formed on a measurement surface (center of a probe distal end) $115_2$ of the fiber probe $115_1$ with the same painting specification as that of the samples 116 (of the same film thickness) to be tested and the painting fiber probe 115 is connected to the measurement unit 17 via a fiber $115_4$. Using the painting fiber probe 115, it is possible to measure absorbance of the coating film $115_3$ by water which has infiltrated into the coating film $115_3$ and reached the fiber probe $115_1$ instead of the surface of the coating film $115_3$ directly splashed with saline water.

A pure water supply unit 20 is connected to the corrosion test device 10. Note that though not shown, the test tank 11 is provided with a drain port to drain the saline water sprayed on the samples 116 and an exhaust port to exhaust the air supplied into the test tank 11. An air concentration sensor 113 shown by a broken line in FIG. 1 may or may not be provided for the corrosion test device 10.

The test tank 11 is a tank for conducting a corrosion test on the samples 116 (corrosion test on paint applied to the samples 116). Each corrosion test is conducted by repeating a cycle consisting of three steps of saline water spraying, drying and wetting on the samples 116.

In the corrosion test device 10, the air supply unit 12 supplies air into the test tank 11. The saline water tank 13 supplies saline water to the saline water spray unit 112. For example, the saline water tank 13 adds sodium chloride (NaCl) to water supplied from the pure water supply unit 20 installed outside the corrosion test device 10 and supplies saline water. The saline water tank 13 is provided with a heater 131 and the heater 131 adjusts the temperature of saline water.

The control unit 14 controls the entire corrosion test device 10 and mainly controls steps on the samples 116 conducted in the order of the saline water spraying step, drying step, and then wetting step.

First, the control unit 14 executes a saline water spraying step. That is, the control unit 14 causes the saline water tank 13 to supply saline water at a predetermined temperature to the saline water spray unit 112 and causes the saline water spray unit 112 to spray saline water on the samples 116 for a predetermined time. The saline water is also sprayed on the painting fiber probe 115.

Next, the control unit 14 executes a drying step. That is, the control unit 14 adjusts temperature and humidity in the test tank 11 using the heating unit 16 and the humidification unit 15, and dries the samples 116. More specifically, the control unit 14 monitors temperature and humidity in the test tank 11 using the temperature/humidity sensor 114 and controls the heating unit 16 and the humidification unit 15 so that the temperature and humidity in the test tank 11 reach predetermined values. The drying is also performed on the painting fiber probe 115.

Furthermore, the control unit 14 obtains absorbance measurement results measured using the painting fiber probe 115 and the measurement unit 17 (absorbance at a specific wavelength of the coating film $115_3$ formed on the painting fiber probe 115) from the measurement unit 17 at predetermined time intervals after drying of the samples 116 is started.

Note that in the present embodiment, absorbance at a specific wavelength of the coating film $115_3$ is measured by FT-IR (Fourier transform infrared spectroscopy), but the measurement of absorbance may be substituted by measurement of absorbance at a specific wavelength derived from a variation in the water content amount of the coating film $115_3$ using other spectrometric methods such as Raman spectroscopy, ultraviolet/visible/near-infrared spectroscopy.

When the value of absorbance at a specific wavelength of the coating film $115_3$ from the measurement unit 17 is determined to have fallen to a predetermined value or less, the control unit 14 stops the heating unit 16 and the humidification unit 15. That is, when the value of absorbance at the specific wavelength of the coating film $115_3$ after drying of the samples 116 is started falls to the predetermined value or less, the control unit 14 determines that drying of the samples 116 has been completed and ends the drying step.

In the present embodiment, an ATR (attenuated total reflection) fiber probe or a reflection fiber probe is suitably used for the fiber probe $115_1$ used for the painting fiber probe 115. Although a transmissive fiber probe or a bare fiber probe can also be used, the probe needs to be buried in the coating film in the case of the transmissive fiber probe or the bare fiber probe, which is not much suitable, whereas a reflection-type probe such as the ATR fiber probe or the reflection fiber probe has a painting specification similar to that of the samples 116 and painting of the measurement surface at the distal end thereof is all that is needed, which provides excellent convenience.

Next, the control unit 14 executes a wetting step. That is, the control unit 14 adjusts temperature and humidity in the test tank 11 using the heating unit 16 and the humidification unit 15 to cause the samples 116 to transfer to a wet state. More specifically, the control unit 14 monitors humidity in the test tank 11 using the temperature/humidity sensor 114, controls the heating unit 16 and the humidification unit 15 so that the temperature and humidity in the test tank 11 reach predetermined values and maintains the samples 116 in a wet state for a predetermined time. In this case, the painting fiber probe 115 is also set in a wet state. The control unit 14 repeats a cycle consisting of three steps of the aforementioned saline water spraying step, drying step and wetting step.

Note that the test conditions stored in the test condition storage unit 141 are used as test conditions such as a required time, concentration of saline water, temperature and humidity in the test tank 11 for the three respective steps of the aforementioned saline water spraying step, drying step and wetting step. Note that these test conditions are input by an administrator et al. of the corrosion test device 10.

The humidification unit 15 performs humidification in the test tank 11 based on an instruction from the control unit 14. The heating unit 16 performs heating in the test tank 11 based on an instruction from the control unit 14. The measurement unit 17 measures absorbance at a specific wavelength of the coating film $115_3$ using the painting fiber probe 115. For example, an FT-IR device is used as this measurement unit 17.

The sample holder 11 is a holder that stores the samples 116 and the painting fiber probe 115. The saline water spray unit 112 sprays saline water supplied from the saline water tank 13 on the samples 116 and the painting fiber probe 115 in the sample holder 11 based on an instruction from the control unit 14. The temperature/humidity sensor 114 measures temperature and humidity in the test tank 11.

Next, an operation procedure of the corrosion test device 10 will be described using FIG. 3.

Saline Water Spraying Step

First, the corrosion test device 10 sprays saline water on the samples 116 and the painting fiber probe 115 using the saline water spray unit 112 for a predetermined time (e.g., 2 hours at 35° C.) (step S1: saline water spraying step).

For example, the control unit 14 sends a signal for starting spraying of saline water to the saline water spray unit 112 and the saline water spray unit 112 that has received the signal starts spraying saline water on the samples 116 and the painting fiber probe 115.

At this time, the control unit 14 obtains temperature information in the test tank 11 from the temperature/humidity sensor 114, adjusts the outputs of the heating unit 16 and the heater 131 in the saline water tank 13, and controls the temperature in the test tank 11 to a predetermined set value (e.g., 35° C.). After a predetermined time (e.g., 2 hours) elapses since the start of saline water spray, the control unit 14 causes the saline water spray unit 112 to stop saline water spray.

Drying Step

After step S1, the corrosion test device 10 dries the samples 116 and the painting fiber probe 115 (step S2: drying step).

For example, the control unit 14 obtains temperature information and humidity information in the test tank 11 from the temperature/humidity sensor 114, adjusts the outputs of the heating unit 16 and the humidification unit 15 and controls the temperature and humidity in the test tank 11 to set values in the drying environment (e.g., temperature: 60° C., humidity: 20 to 30%), and thereby dries the samples 116 and the painting fiber probe 115.

After drying the samples 116 and the painting fiber probe 115, the control unit 14 obtains absorbance at a specific wavelength of the coating film $115_3$ formed on the painting fiber probe 115 from the measurement unit 17 at predetermined time intervals.

When an absorbance value at a specific wavelength of the coating film $115_3$ obtained at predetermined time intervals, that is, an absorbance value at a specific wavelength of the coating film $115_3$ obtained at regular intervals falls to a predetermined value (e.g., a value obtained by measuring in advance, absorbance at a specific wavelength of the coating film $115_3$ equilibrated with the atmosphere of humidity 50% RH) or less, the control unit 14 assumes that drying of the samples 116 has completed and stops drying by the heating unit 16 and the humidification unit 15.

Note that when a variation per unit time of absorbance at a specific wavelength of the coating film $115_3$ falls to a predetermined value or less (e.g., when a variation in an absorbance value in 10 minutes falls to 0.001 or less), the control unit 14 may assume that the drying of the samples 116 has completed and stop the drying by the heating unit 16 and the humidification unit 15. Here, as for the specific wavelength, any wavelength may be suitably used if it is a wavelength where there is absorption by water, and 1640 $cm^{-1}$ is preferably used where there is a large variation in absorbance due to absorption or drying of water in the coating film.

According to experiments by the inventor et al., in the case of commercially available epoxy resin paint for steel structure, absorbance at 1640 $cm^{-1}$ dropped from 0.09 in a water-saturated state (when immersed in water for a long time) to 0.05 during drying (equilibrated with the atmosphere of 50% RH). Thus, when, for example, the variation in absorbance per 10 minutes falls to 0.001 or less, it may be possible to assume that the coating film $115_3$ has dried.

Note that in the drying step in step S2 above, the corrosion test device 10 may provide a plurality of combinations of the painting fiber probe 115 and the measurement unit 17 and the control unit 14 may assume that drying of the samples 116 has completed and end the drying step when an absorbance value at a specific wavelength and a variation per unit time fall to predetermined values or less at all the measurement units 17.

Furthermore, in the above process in step S2, the corrosion test device 10 measures a variation in absorbance of the coating film $115_3$ until a predetermined time (e.g., 30 minutes) elapses after starting drying of the samples 116 as an initial variation in absorbance and measures a subsequent variation in absorbance of the coating film $115_3$ at predetermined time intervals (e.g., every 10 minutes). When the variation in absorbance of the coating film $115_3$ at predetermined time intervals falls to a predetermined rate or less (e.g., 1/20 or less with respect to the variation in absorbance for initial 30 minutes) with respect to the initial variation in absorbance, the corrosion test device 10 may assume that the drying of the samples 116 has completed, and end the drying step.

Between the painting fiber probe 115 and the samples 116, there are individual differences in film thickness, painting base materials differ between the fiber probe (plastic) and the steel material (zinc plated steel material and steel material), and the behavior of water during drying existing on the interface between the coating film and the painting base material differs slightly. Accordingly, in order to completely dry the samples 116, the drying step may be ended not immediately after it is determined that drying has completed based on absorbance of the coating film $115_3$ formed on the painting fiber probe 115, but when a certain period of time elapses after it is determined that drying has completed (e.g., 10 minutes later).

Wetting Step

After step S2, the control unit 14 sets the samples 116 and the painting fiber probe 115 in a wet state for a predetermined time (e.g., 2 hours) (step S3: wetting step).

For example, the control unit 14 obtains temperature information and humidity information in the test tank 11 from the temperature/humidity sensor 114, adjusts the outputs of the heating unit 16 and the humidification unit 15, and controls the temperature and humidity in the test tank 11 to set values in the wetting environment (e.g., temperature: 5° C., humidity: 98%).

When a predetermined time (e.g., 2 hours) elapses after setting the temperature and humidity in the test tank 11 to set values in the wetting environment, the control unit 14 ends the wetting step in step S3.

After that, the control unit 14 determines whether a predetermined time has elapsed after the start of the test (step S4), if the predetermined time has not passed yet (No in step S4), the flow returns to the saline water spraying step in step S1. The control unit 14 repeats the processes in steps S1 to S3 to thereby accelerate corrosion of the samples 116.

When a predetermined time elapses after the start of the test (Yes in step S4), the control unit 14 ends the test. Note that the test may be ended when a cycle consisting of steps S1 to S3 is repeatedly executed a predetermined number of times.

Thus, the corrosion test device 10 of the present embodiment ends the drying when the absorbance value at a specific wavelength of the coating film $115_3$ formed on the painting fiber probe 115 in the drying step of step S2 falls to a predetermined value or less, and can thereby shorten the time required for the drying step.

That is, in the conventional corrosion test (see Non-Patent Literature 1), a relatively long drying time (4 hours) is set in the drying step by taking into consideration the fact that samples hard to dry are used, but drying of a sample may be actually completed within 4 hours.

Thus, the corrosion test device 10 of the present embodiment measures absorbance at a specific wavelength of the coating film $115_3$ formed on the painting fiber probe 115 in the drying step, determines, when the absorbance value at the specific wavelength of the coating film $115_3$ falls to a predetermined value or less, that the drying of the samples 116 has completed, ends the drying step and proceeds to a next wetting step. Therefore, the corrosion test device 10 reliably dries the various samples 116, and can proceed to the next wetting step after the short drying time.

As in the case of the drying step in step S2, when the absorbance value at a specific wavelength of the coating film $115_3$ formed on the painting fiber probe 115 falls to a predetermined value or less, the corrosion test device 10 ends the drying of the samples 116 and thereby shortens the drying time from on the order of 4 hours to 1 hour in the case of, for example, a coating film on the order of 100 to 200 m (undercoating/intermediate coating: epoxy resin paint, finish coating: polyurethane resin paint).

As a result, for example, the current system (see Non-Patent Literature 1) applied, to a painted steel material having a thickness on the order of 100 to 200 m, a cycle of a saline water spraying step (temperature: 35° C., time: 2 hours), a drying step (temperature: 6° C., time: 4 hours), and a wetting step (temperature: 50° C., humidity 95% or more, time: 2 hours). By contrast, the corrosion test device 10 of the present embodiment applies a cycle of a saline water spraying step (temperature: 35° C., time: 2 hours), a drying step (temperature: 6° C., time: 1 hour), and a wetting step (temperature: 50° C., humidity 95% or more, time: 2 hours).

That is, since the time required for 1 cycle is reduced from 8 hours to 5 hours, it is possible to reduce the test time until corrosion of the samples 116 advances to the same level in the current system to approximately ⅝. As a result of shortening the test time, the operation time of the heating unit 16 and the heater 131 or the like of the corrosion test device 10 is also shortened, and so power consumption required for a corrosion test can also be reduced.

Experiment Results

Next, in order to verify effects of the test method using the corrosion test device 10 of the present embodiment, a comparison was made with the test method of the current system (see Non-Patent Literature 1). FIG. 4 illustrates test conditions.

Note that although embodiments of the present invention are a test method that uses a painted steel material as a sample and repeats a cycle consisting of three steps of saline water spraying, drying and wetting on the sample, in order to compare the corrosion speed with that of the test method of the current system, using, as the samples, two kinds of steel materials: unpainted steel and zinc, a comparison was made in the corrosion speed per unit area or per unit time.

Figures 3, 4:
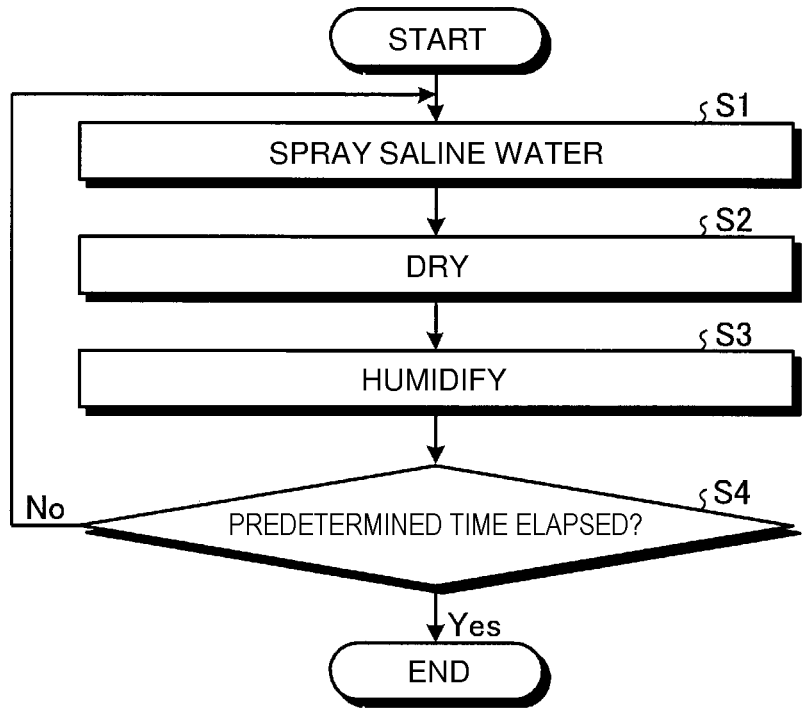
FIG. 3 is a diagram illustrating an operation procedure of the corrosion test device.
FIG. 4 is a diagram illustrating test conditions of a corrosion test.

The test method according to the current system as shown in FIG. 4 as the "CURRENT SYSTEM," was assumed to have NaCl concentration of saline water: 5 wt %, temperature in test tank 11: 35° C., time: 2 h in the saline water spraying step. Furthermore, the test method according to the current system was also assumed to have temperature in the test tank 11: 6° C., time: 4 h in the drying step, and temperature and humidity in the test tank 11: 50° C. 95% RH, time: 2 h in the wetting step.

Furthermore, according to the test method of embodiments of the present invention, drying was ended when a variation per unit time in absorbance at a specific wavelength of the coating film $115_3$ formed on the painting fiber probe 115 in the drying step fell to a predetermined value or less and the same conditions as those of the current system were used as the conditions in the saline water spraying step and the wetting step other than the drying step as shown in FIG. 4 as an embodiment of the "PRESENT INVENTION." In the drying step of embodiments of the present invention, the time until the variation per unit time in absorbance at a specific wavelength of the coating film $115_3$ formed on the painting fiber probe 115 fell to the predetermined value or less was on the order of 1 hour from the start of the drying step.

FIG. 5 illustrates the test results under the test conditions shown in FIG. 4. According to the test method of the current system, the corrosion speed of steel was 80 (g/m²/day) and the corrosion speed of zinc was 15 (g/m²/day). On the other hand, in the case of the test method of embodiments of the present invention, the corrosion speed of steel was 127 (g/m²/day) and the corrosion speed of zinc was 23 (g/m²/day). That is, the time required for the drying step could be shortened from 4 hours in the current system to 1 hour in embodiments of the present invention, and accordingly the time required for one cycle in a corrosion test could also be shortened from 8 hours to 5 hours, and the corrosion speed of the sample was improved. That is, in the drying step, the time of the corrosion test on the sample could be shortened by ending the drying of the sample when the variation per unit time in absorbance at a specific wavelength of the coating film $115_3$ formed on the painting fiber probe 115 fell to the predetermined value or less.

Note that Non-Patent Literature 2 states that a ratio of time period during which the sample is wet (that is, the saline water spraying step and the wetting step) with respect to the time required for all steps of the saline water spraying step, the drying step and the wetting step should be 50% as a condition to secure reliability of a corrosion test. This is based on experiment results that when the ratio of the time period during which the sample is wet is set to a higher value (more than 50%), corrosion of the sample is more accelerated, but corrosion occurs, which is quite different in appearance from corrosion occurring in an real environment and corrosion test reliability cannot be ensured. For this reason, the test conditions of JIS described in Non-Patent Literature 1, for example, a test condition in which the saline water spraying step (2 hours), the drying step (4 hours), and the wetting step (2 hours) constitute one cycle and the ratio of time period during which the sample is wet is 50% has conventionally been used.

By contrast, in the corrosion test, "that water should not excessively infiltrate into the sample" is more important than "the ratio of time period during which the sample is wet" and it is reported that under the following condition: if the "temperature and time in a state in which the sample is continuously wet" is set to a predetermined value or less, even when "the ratio of time period during which the sample is wet" is increased and acceleration is enhanced, it is possible to reproduce corrosion quite similar to corrosion occurring in a real environment and secure test reliability (Non-Patent Literature 3). That condition is to set the "temperature and time in a state in which the sample is continuously wet" to a wetting step of 50° C., 2 hours+a saline water spraying step of 35° C., 2 hours.

Thus, the "time period during which the sample is continuously wet (the wetting step+the saline water spraying step) is set to 4 hours" in the corrosion test device 10, and when the variation per unit time of absorbance at a specific wavelength of the coating film $115_3$ formed on the painting fiber probe 115 falls to a predetermined value or less in the drying step of the corrosion test and it is determined that drying has completed, in the case where the drying step is ended, many samples show the following appearance, and it is possible to secure corrosion reliability and shorten the time required for the drying step. The above-described appearance means that since drying is ended in 30 minutes to 2 hours, the ratio of time period during which the sample is wet becomes above 50%, corrosion of the sample is more accelerated and at the same time the "time period during which the sample is continuously wet falls to the predetermined time or less." Therefore, it is possible to shorten the time of a corrosion test on the sample.

When steel materials coated with the same paint were actually tested using the test method of the current system t (see Non-Patent Literature 1) and the test method of embodiments of the present invention, it has been proven that, compared with the current system, the test method of embodiments of the present invention can reproduce results (occurrence of swelling and rust) similar to those of the test method of the current system (see Non-Patent Literature 1) in a shorter time of approximately ⅔ of the time in the current system.

Many studies have been conducted to analyze the amount of water on the sample surface and a variation thereof using a spectrometric device such as FT-IR and a reflection measurement attachment such as diamond ATR. However, those devices normally measure the side (surface) exposed to the outside of the sample. Thus, even if water remains inside the coating film, if the surface is dried, the devices may assume that the sample has been dried.

On the other hand, as shown in FIG. 2, embodiments of the present invention paints the measurement surface $115_2$ of the fiber probe $115_1$ and can thereby measure the water content of the coating film $115_3$ in contact with the distal end of the fiber probe $115_1$, not the outside (surface) of the sample, and can precisely determine whether the boundary between the coating film and the painted object about a sample (painted steel sheet) other than the painting fiber probe 115 coated with the same specification as that of the painting fiber probe 115 has been dried, which cannot be easily analogized.

In addition to embodiments of the present invention, examples of methods of detecting that a coating film is dried include a method of measuring a weight of the coating film at a certain interval and determining that drying has been completed when the weight falls to a predetermined value or less or when a weight variation per unit time has decreased, or a method of arranging electrodes in a coating film, measuring impedance or resistance of the coating film and determining that drying has been completed when the values fall to predetermined values or less or when a variation per unit time has decreased. However, the former has difficulty realizing a mechanism capable of measuring weights of coating films with accuracy to be able to determine drying of the coating film in the corrosion test device that sprays saline water and the latter has difficulty, in the case of a coating film having high insulating properties, measuring a variation in impedance or resistance of the coating film. On the other hand, embodiments of the present invention measures absorbance at a specific wavelength by water that has transmitted through the coating film, and can thereby avoid the aforementioned problems.

Extension of Embodiment

Although the present invention has been described with reference to the embodiment, the present invention is not limited to the above embodiment. Various changes that can be understood by those skilled in the art can be made to the configuration and details of the invention without departing from the technical thought of the invention.

REFERENCE SIGNS LIST 10 corrosion test device,
11 test tank,
12 air supply unit,
13 saline water tank,
14 control unit,
15 humidification unit,
16 heating unit,
17 measurement unit,
20 pure water supply unit,
111 sample holder,
112 saline water spray unit,
113 air concentration sensor,
114 temperature/humidity sensor,
115 painting fiber probe,
$115_1$ fiber probe,
$115_2$ measurement surface,
$115_3$ coating film,
$115_4$ fiber,
116 sample,
131 heater,
141 test condition storage unit.

The invention claimed is:
1. A corrosion test method comprising:
using a painted steel material as a sample;
spraying saline water on the sample and a painting fiber probe, wherein a coating film on a measurement surface of the painting fiber probe has a same painting specification as the sample;
placing the sample and the painting fiber probe in a test tank to evaluate corrosion resistance of paint of the painted steel material;

drying the sample and the painting fiber probe after spraying the saline water on the sample and the painting fiber probe, wherein drying the sample and the painting fiber probe comprises:
- measuring, at regular intervals and at a specific wavelength, absorbance of the coating film on the painting fiber probe;
- drying the sample and the painting fiber probe until the absorbance of the coating film satisfies a predetermined condition; and setting the sample and the painting fiber probe in a wet state after drying the sample and the painting fiber probe.

2. The corrosion test method according to claim 1, wherein drying the sample and the painting fiber probe ends when a measured absorbance value of the absorbance of the coating film satisfies the predetermined condition.

3. The corrosion test method according to claim 1, wherein drying the sample and the painting fiber probe ends when a variation in the absorbance of the coating film per unit time satisfies the predetermined condition.

4. The corrosion test method according to claim 1, wherein drying the sample and the painting fiber probe is ended when a subsequent variation in the absorbance of the coating film at predetermined time intervals falls to a predetermined rate or less with respect to an initial absorbance variation, and wherein a variation in the absorbance of the coating film until an initial predetermined time elapses is the initial absorbance variation.

5. The corrosion test method according to claim 1, wherein drying the sample and the painting fiber probe ends when a predetermined time elapses after the absorbance of the coating film satisfies the predetermined condition.

6. The corrosion test method according to claim 1, wherein the painted fiber probe is a reflection-type fiber probe.

7. A corrosion test device comprising:
- a saline water sprayer that sprays saline water on a sample and a painting fiber probe, wherein the sample is a painted steel material, wherein a coating film on a measurement surface of the painting fiber probe has a same painting specification as the sample, and wherein the sample and the painting fiber probe are placed in a test tank to evaluate corrosion resistance of paint of the painted steel material;
- an air supplier that supplies air into the test tank;
- a heater that performs heating in the test tank;
- a humidifier that performs humidification in the test tank;
- a measurer that measures absorbance of the coating film on the painting fiber probe at a specific wavelength; and
- a controller that:
  - causes the saline water sprayer to spray saline water on the sample and the painting fiber probe for a predetermined time;
  - causes the heater to start drying the sample and the painting fiber probe after the saline water sprayer sprays the saline water;
  - causes the heater to continue drying of the sample and the painting fiber probe until the absorbance of the coating film at the specific wavelength satisfies a predetermined condition; and
  - causes the heater and the humidifier to set the sample and the painting fiber probe in a wet state for a predetermined time.

8. The corrosion test device according to claim 7, wherein the controller obtains the absorbance of the coating film at the specific wavelength from the measurer at regular intervals.

9. The corrosion test device according to claim 7, wherein the controller causes the heater to end drying the sample and the painting fiber probe when a measured value of the absorbance of the coating film satisfies the predetermined condition.

10. The corrosion test device according to claim 7, wherein the controller causes the heater to drying the sample and the painting fiber probe when a variation in the absorbance of the coating film per unit time satisfies the predetermined condition.

11. The corrosion test device according to claim 7, wherein the controller causes the heater to end drying the sample and the painting fiber probe when a subsequent variation in the absorbance of the coating film at predetermined time intervals falls to a predetermined rate or less with respect to an initial absorbance variation, and wherein a variation in the absorbance of the coating film until an initial predetermined time elapses is the initial absorbance variation.

12. The corrosion test device according to claim 7, wherein the controller causes the heater to end drying the sample and the painting fiber probe ends when a predetermined time elapses after the absorbance of the coating film satisfies the predetermined condition.

13. The corrosion test device according to claim 7, wherein the painted fiber probe is a reflection-type fiber probe.

* * * * *